United States Patent [19]

Zimmerman

[11] 4,295,772
[45] Oct. 20, 1981

[54] HAY BALE STACKER

[76] Inventor: Lawrence Zimmerman, R.F.D 2, New Richmond, Wis. 54017

[21] Appl. No.: 147,463

[22] Filed: May 7, 1980

[51] Int. Cl.³ .................... A01D 87/12; B65G 57/28
[52] U.S. Cl. ........................... 414/38; 414/44; 414/58; 414/436; 414/485; 414/508
[58] Field of Search ............... 414/38, 44, 58, 111, 414/434, 435, 436, 485, 508; 56/473.5, 476, 480

[56] References Cited

U.S. PATENT DOCUMENTS

| | | | |
|---|---|---|---|
| 3,223,253 | 12/1965 | Garbe et al. | 414/58 X |
| 3,357,579 | 12/1967 | Goodsell | 414/485 |
| 3,406,840 | 10/1968 | Soteropulos | 414/44 X |
| 3,412,882 | 11/1968 | Stockwell | 414/434 X |
| 3,450,281 | 6/1969 | Groberg | 414/436 |
| 3,487,955 | 1/1970 | Brown | 414/44 X |
| 4,259,034 | 3/1981 | Ward et al. | 414/38 X |

Primary Examiner—Leslie J. Paperner

[57] ABSTRACT

A tiltable device for forming weather-proof stacks of hay bales which in the preferred embodiment contains thirty bales per stack comprising a tiltable bed of generally "L" shaped cross-section carried on an axle and adapted to be towed behind a hay baler, the forward legs portion of the bed providing a platform oriented somewhat greater than 90°, the device being equipped with hydraulic means to tilt the same and a side rail situated to enable a bale stacking person to ride with the device as it tilts back to deposit a stack of bales.

8 Claims, 6 Drawing Figures

HAY BALE STACKER

BACKGROUND OF THE INVENTION

Various devices have previously been used to trail behind a haybaler for the purpose of stacking bales, either for immediate removal from field as in the case of a four wheel trailer, or for depositing small stacks in the field for further curing and later removal of the hay. An example of the latter system is a sled-type device or "stoocker" such as is disclosed in U.S. Pat. No. 2,833,109. Devices have been proposed for automatically stacking the bales on such a device and then depositing them on the field for later removal for example, as shown in U.S. Pat. No. 3,158,270.

The present invention provides a novel and improved device for forming hay bales into stacks and depositing them in stacks which in accordance with the preferred mode of the invention contains thirty bales. The stacks provided by the device of the present invention are stable and can readily be moved again either by using the device itself or a conventional front end loader on a farm tractor. By the use of the device of the invention high moisture content hay can be baled and stacked in the field for further curing by the sun and wind. The resulting stacks are moisture shedding so that even if the stacks are rained upon, only the outer inch or two of the hay becomes weathered. The device of the present invention has the further advantage of simplicity and lack of wearing parts and is thus extremely durable.

Briefly summarized, the present invention provides a baler trailing assembly having an axle and two wheels provided with a hitch means adapted to be towed behind a hay baler on which is mounted a tiltable bale carrying bed of generally "L" shaped cross-section which is pivotable between an upward bale stacking position and a downward bale depositing position by pivoting about the axle, the forward portion of the bed being preferably formed of a metal grate or the like on which a bale stacking person can stand and equipped with side rails on which the bale stacking person can stand as the unit is tilted backward to deposit the bales. The rearward portion of the bale carrying bed consists of bale supporting tines spaced apart from each other a sufficient distance to allow hay bales to be positioned there-between at an angle such that only the corners of the lower row of bales touch the ground. It is important that the angle between the legs of the platform be greater than 90° and preferably at least 93° so that the stack as it is formed will lean slightly toward what becomes the front of the stack when deposited. It was originally attempted to use a bed in which the legs were perpendicular to each other but this resulted in the stacks being tilted backward by the momentum generated as the device was tipped down and the bales were deposited on the ground. By having the proper angle between the legs of the bale carrying platform oriented as indicated between 93° and 120°, this problem is eliminated and the resultant stacks stand up vertically when deposited on the ground behind the travelling device.

Further advantages and objects of the invention will be apparent from the accompanying description and drawings, in which.

DESCRIPTION OF THE PREFERRED EMBODIMENT

Figure 1:
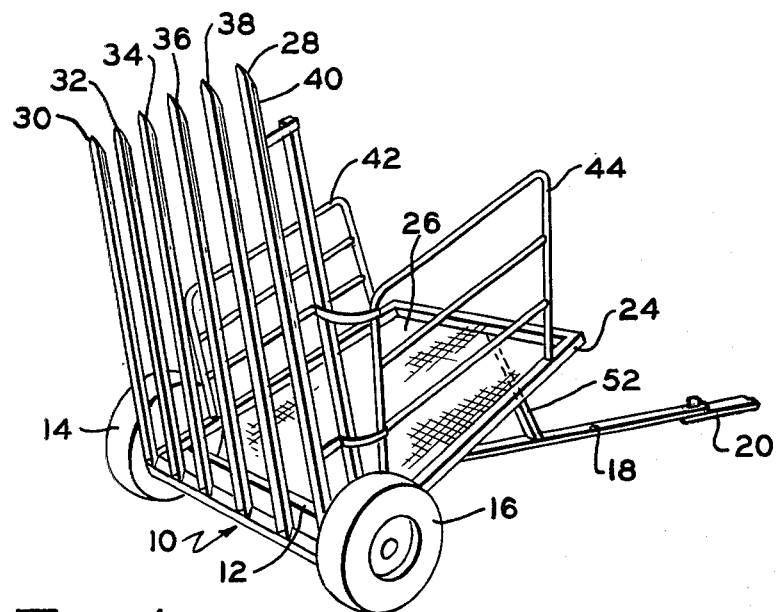
FIG. 1 is a perspective view of the device of the present invention.

Referring more particularly to the drawings, there is shown in FIG. 1 a baler trailing assembly, indicated generally by numeral 10. Assembly 10 includes an axle 12 and two wheels, 14 and 16, preferably equipped with inflated rubber tires. A hitch assembly 18 is provided as a means for attaching the assembly to the rear of a hay bale by means of a pin 22. As indicated in the drawings, hitch assembly 18 is generally "Y" shaped in order to enable the same to be attached to opposite ends of the axle 12.

Figure 2:
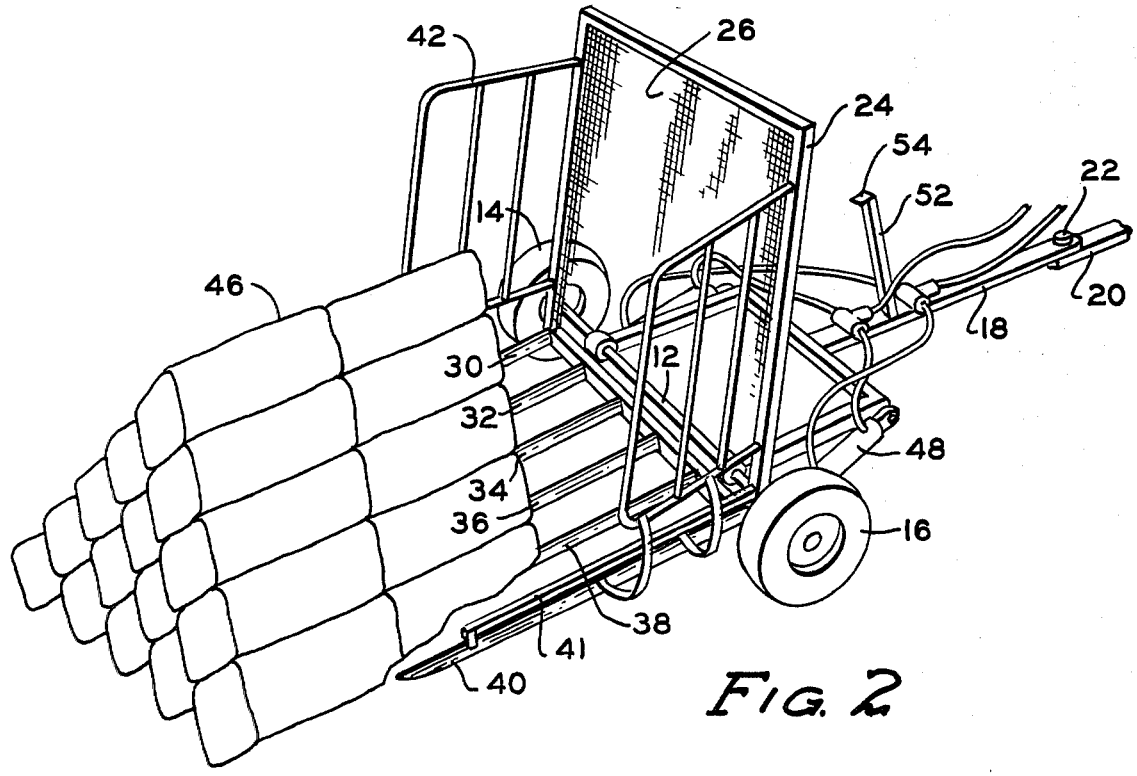
FIG. 2 is a perspective view of the invention tilted back in the bale stack depositing position with a stack in the process of being deposited on the ground.
Figure 3:
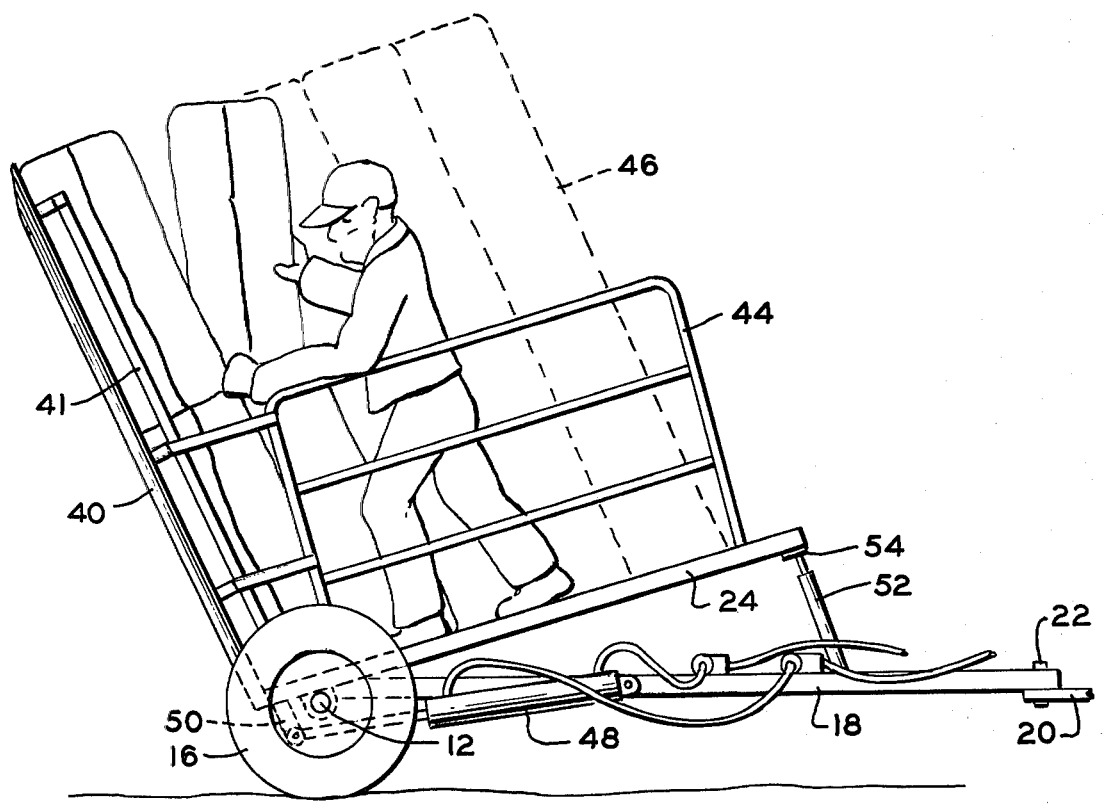
FIG. 3 is a side view of the device of the present invention in the upright bale stacking position together with a partially formed bale stack and bale stacking person standing on the device.

Pivoted about axle 12 is a tiltable bale-carrying bed, 24. As shown, bed 24 is of a generally "L" shaped configuration. One leg 26 of the "L" forms a bed or platform which may be a metal grate or the like upon which the bale stacking person can stand and across which the bales may be conveyed to be stacked. The other leg 25 of the "L" comprises plurality of tines. In the preferred embodiment there are six such tines, 30, 32, 34, 36, 38 and 40. These tines form a support against which a stack of bales can be formed as shown in FIG. 3 and are readily withdrawable when the bales are being deposited as shown on FIGS. 2 and 5. Also provided on each side of bed 24 are slide rails 42 and 44. The stack of bales shown for illustrative purposes indicated generally by numeral 46.

Means 48 which may be a hydraulic cylinder mechanism or other power operated mechanism such as an electric winch 49 is provided to tilt the bale carrying bed from the upright position to the lowered position and back. As indicated there is an attaching means 50 provided on the bed which is offset from axle 12 in order to provide leverage for rotation of the bed. The opposite end of the tilting means 48 is attached as indicated to draw bar 18 which is provided with crossmembers or other appropriate means for attachment thereof. Attached to the top of draw bar 18 is a stop mechanism 52 having an extensible end 54. The angle of bed 24 with respect to the ground can be adjusted thereby. A set screw or similar means is used to position end 54.

Figure 6:
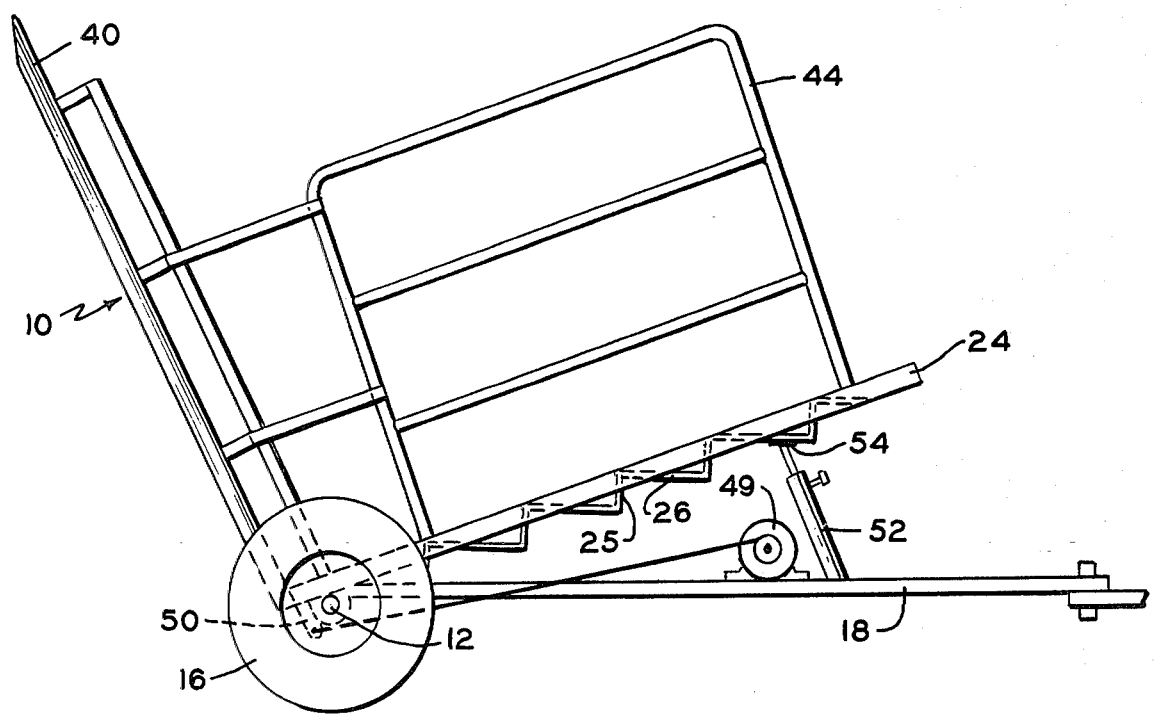
FIG. 6 is a side view illustrating a further embodiment of the invention.

An alternative embodiment is shown in FIG. 6 in which the upper platform 26 is provided with steps 25. This embodiment facilitates operations in which platform 26 is sloped relatively steeply with respect to the ground by providing a more readily negotiable path for the bale stacking person to walk on.

In operation, the stacking device is attached to the rear of a hay baler. The bale carrying bed is oriented in the upright position shown in FIG. 1 for stacking the bales. As the bales are discharged from the baler the bale stacking person forms a stack of bales as shown in FIG. 3. In the preferred embodiment, shown in the drawings, two stacks of fifteen bales each are formed which provides a total stack of thirty bales. Similar stacks with different numbers of bales may, of course, be provided. A guide 41 is provided to assure that the first bale placed with a corner between tines 30 and 32 is formed at an optimum angle for forming a stack of bales. As described in my earlier application, Ser. No. 884,419, filed March 8, 1978, now abandoned, a stable stack is formed if the bales are oriented with the axis of the long side of the bales at 55° or more with respect to the ground. For example, if the bales are oriented at a lesser angle such as 45° the stacks will be extremely unstable and will tip over to the left, as viewed in FIG. 5. The angle of the bales in stack is determined by the angle between the edges of guide 41 and tine 30 which are positioned at an angle of at least 55° with respect to axle 12. As seen in FIG. 3, the bale stacking person can walk on platform 24 and manually carry the bales downward to be stacked against the row of tines. While connecting means 50 is illustrated as being offset below the axle, the same can alternatively be located above the axle particularly if it is desired to increase the leverage by positioning the same a greater difference from the axle.

Figure 4:
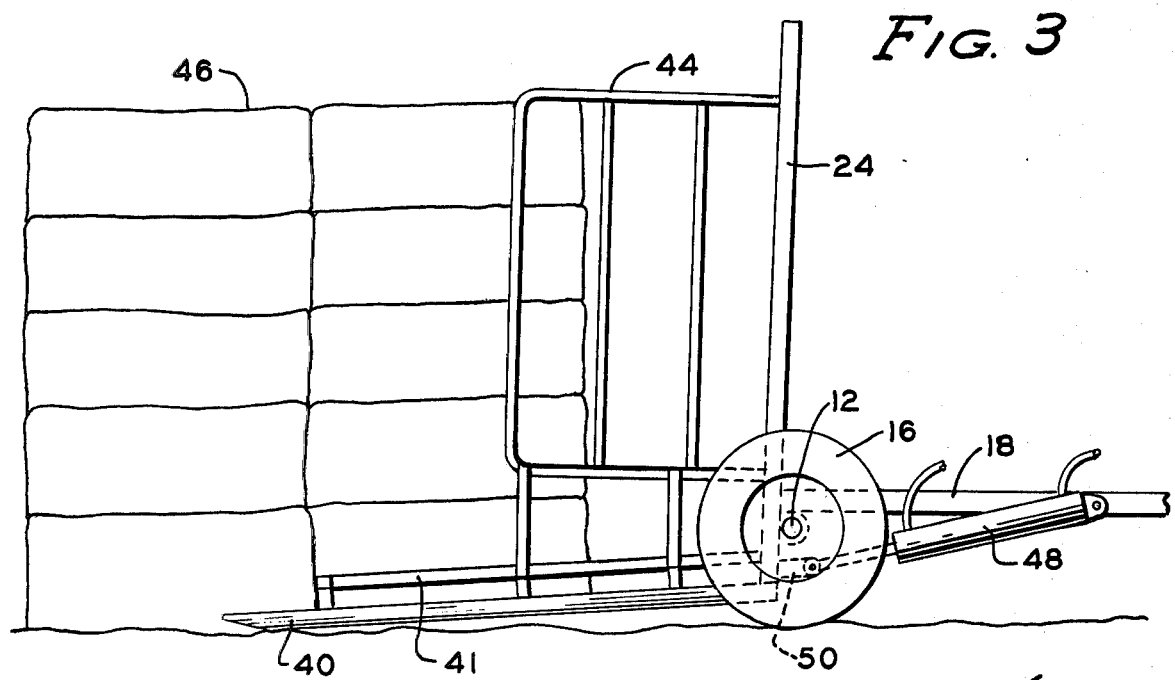
FIG. 4 is a side view of the device according to the invention in the lowered position.

Once the stack of bales is completed, the bed pivoting or tilting means 48 which, as above noted, may be either hydraulic cylinder 48 or an electrically operated winch 49, tilts the mechanism to the position shown in FIG. 4 so that the extremities or ends of the tines touch the ground. Then, as seen in FIG. 2, the stack of bales is left behind as the baler and attachment are pulled forward. During tilting the bale stacking person is able to stand on the sides of railing 44 and can easily ride with the device as it is tilted forward again after the bale stack has been deposited on the ground. The control mechanism (not shown) for actuating the pivoting means is usually located on the towing tractor, but alternatively, can be placed on the bale stacking attachment itself.

As mentioned above, the angle between tines 30, 32, 34, 36, 38 and 40 (leg 28) and that of leg 26 as viewed in FIG. 4 should be between 93° and 120°. Earlier attempts of applicant using a device in which the two parts of the "L" shaped carrier device 26 and 28 was oriented at 90° was found to have difficulties in that forward end of the tines tended to plow into the ground. It has also been found easier to provide a device which will readily deposit the bales on the ground when the preferred angle between the legs 26 and 28 is utilized. A further advantage is that it is such construction that makes it easier for the bale stacking person to stand on the device when it is tilted into the unloading position.

The orientation of the bale stacking platform can be adjusted by adjusting set screws which determine the length of extension of adjustable supporting braces 52, 54. An orientation such as shown in FIG. 3 is preferred. If a steeper orientation is preferred, it becomes more desirable to provide steps in platform 26 as shown in FIG. 6. As indicated in FIG. 2, hydraulic cylinders 48 may be provided on either side of the device. Alternatively a single hydraulic cylinder 48 more centrally located or an electric winch 49 similarly located may be employed.

Figure 5:
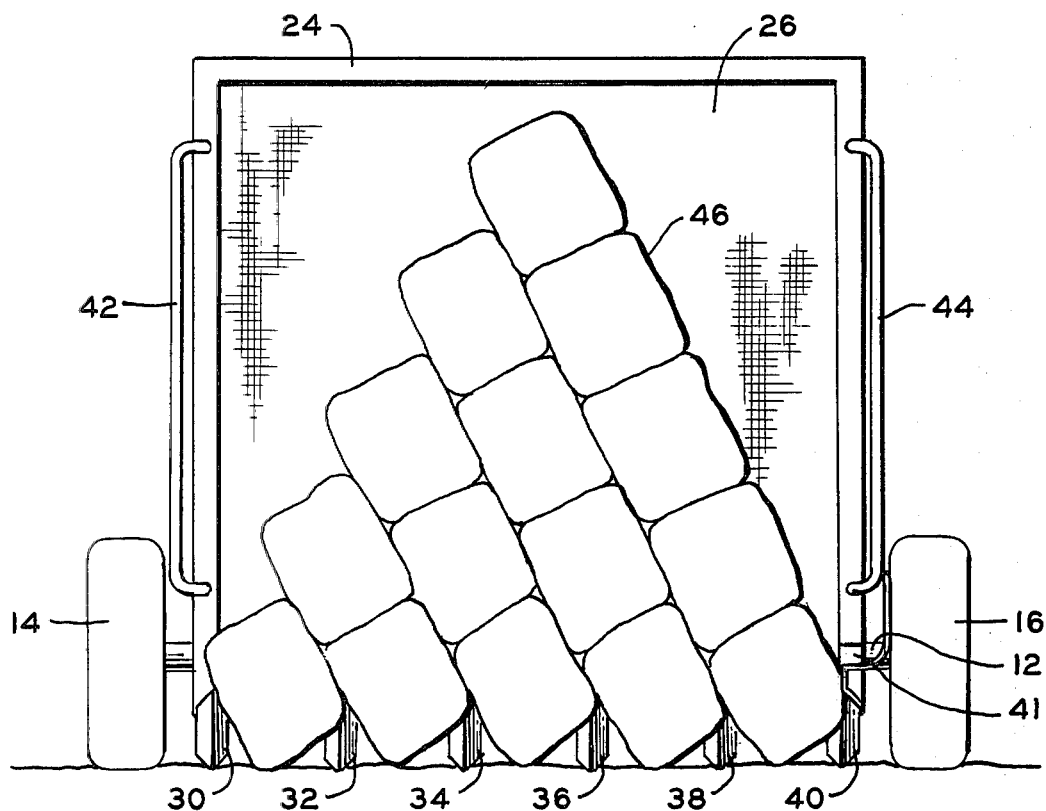
FIG. 5 is a rear view of the device of the present invention in the unloading position illustrating a complete stack of bales thereupon.

Stacks of the type indicated in FIG. 2 and FIG. 5 have been found to be highly stable and watershedding. If it is desired to subsequently move the stack, it has been found that this can readily be done by backing the bale stacking device under the bale again and moving it leftward (as viewed in FIG. 2). The hydraulic cylinders 48 are then used to once again tilt the stacks upright for transportation, for example, to a storage area or feeder lot. Alternatively, a front end loader may be provided on a tractor with tines appropriately spaced to fit under the stack. The stacks can readily be formed into larger stacks by first placing two stacks next to each other, filling in the space between the two stacks manually if desired and then placing a third stack above this combined stack using a front end loader. This provides a high, stable, rainshedding stack of bales which may be stored either in a shelter or in the open.

It has further been noted with the stacks provided by the device of the present invention that air is able to travel between the bales adjacent the ground to the center of the stack and that heat from the stack produced during drying of the hay tends to circulate outward by convection to a surprising degree, thus assuring airing of the hay without excessive loss of protein content.

The advantages and utility of the stacking device of this invention will be clearly evident from the preceeding description and will be understood that various changes and modifications may be resorted to as fairly come within the scope of the following claims.

What is claimed is:

1. A tiltable device for stacking bales behind a hay baler and for lifting and transporting stacks of bales so formed comprising in combination,
    (a) a trailer assembly comprising an axle provided with wheels at each end and a hitch unit attached thereto adapted to be attached to a towing vehicle;
    (b) a bale carrying bed of generally "L" shaped cross-section pivotably attached to said axle, said bed being attached to said axle at a point on the forward leg of said "L", spaced from the junction of said legs a distance which is less than the radius of said wheels; the angle between the legs of said "L" being greater than 90°,
    (c) the more forward leg of said "L" forming a platform suitable to support a standing person and being equipped with side rails,
    (d) the rearward leg of said "L" comprising a plurality of bale supporting tines adapted to support a stack of bales manually assembled there-against, the extremities of said tines on said rearward leg adapted to touch the ground on pivoting of said assembly, and
    (e) means for pivoting said assembly about said axle.

2. A device according to claim 1 wherein said bed is provided with side rails situated to enable the bale stacking person to ride with the device as it tilts back and forth.

3. A device according to claim 1 wherein the angle between said legs is between 93° and 120°.

4. A device according to claim 1 wherein said hitch unit is provided with means to limit the forward pivoting of said assembly.

5. A device according to claim 4 wherein said limiting means is adjustable.

6. A device according to claim 1 wherein said pivoting means comprises hydraulically actuated cylinders.

7. A device according to claim 1 wherein a guide rail is provided parallel to one of the end tines, to assist in positioning hay bales thereon, the acute angle between a line drawn between the inner edge of said guide and the inside edge of said outer tine and said axle being at least 55°.

8. A tiltable device for stacking bales behind a hay baler and for lifting and transporting stacks of bales so formed comprising in combination,
   (a) a trailer assembly comprising an axle provided with wheels at each end and a hitch unit attached thereto adapted to be attached to a towing vehicle;
   (b) a bale carrying bed of generally "L" shaped cross-section pivotably attached to said axle, said bed being attached to said axle to a point on the forward leg of said "L", spaced from the junction of said legs a distance which is less than the radius of said wheels; the angle between the legs of said "L" being between 93° and 120°.
   (c) the more forward leg of said "L" forming a platform suitable to support a standing person and being equipped with side rails.
   (d) the rearward leg of said "L" comprising a plurality of bale supporting tines adapted to support a stack of bales manually assembled there-against, the extremities of said tines on said rearward leg adapted to touch the ground on pivoting of said assembly,
   (e) means for pivoting said assembly about said axle,
   (f) adjustable stop means being provided on said hitch unit to adjustably limit the forward pivoting of said assembly, and
   (g) a guide rail parallel to one of the end tines in said rearward leg to assist in positioning hay bales thereon, the acute angle between a line drawn between the inner edge of said guide and the inside edge of said outer tine and said axle being at least 55°.

* * * * *